United States Patent [19]
Witte et al.

[11] 3,721,916
[45] March 20, 1973

[54] COLD CATHODE CONSTRUCTION FOR GASEOUS LASER

[75] Inventors: Robert S. Witte, Redondo Beach; C. Lee Dailey, Palos Verdes Estates; Milford J. Eck, Anaheim; Walter H. Rutherford, Clearlake Highlands, all of Calif.

[73] Assignee: TRW Inc., Redondo Beach, Calif.

[22] Filed: April 28, 1971

[21] Appl. No.: 138,141

[52] U.S. Cl..................................331/94.5, 330/4.3
[51] Int. Cl....................................................H01s 3/09
[58] Field of Search ...................331/94.5; 330/4.3

[56] References Cited

UNITED STATES PATENTS

| | | | |
|---|---|---|---|
| 3,555,451 | 1/1971 | Witte et al. | 331/94.5 |
| 3,614,654 | 10/1971 | Gronros et al. | 331/94.5 |
| 2,162,505 | 6/1939 | James et al. | 331/94.5 |
| 3,383,621 | 5/1968 | Luck, Jr. et al. | 331/94.5 |

*Primary Examiner*—William L. Sikes
*Attorney*—Daniel T. Anderson, Edwin A. Oser and Jerry A. Dinardo

[57] ABSTRACT

A gaseous laser of the type having a coaxial cold cathode constructed to minimize sputtering of the windows of the laser. The laser is preferably an argon or xenon-ion laser with an indium cathode disposed at one end of the insulating envelope and surrounding an insulating tube which extends in a direction toward the anode to minimize sputtering. Alternatively, both cathode and anode may consist of indium and may be disposed on the outside of the end portions of the laser envelope with the end portions extending beyond the electrodes and towards each other.

5 Claims, 2 Drawing Figures

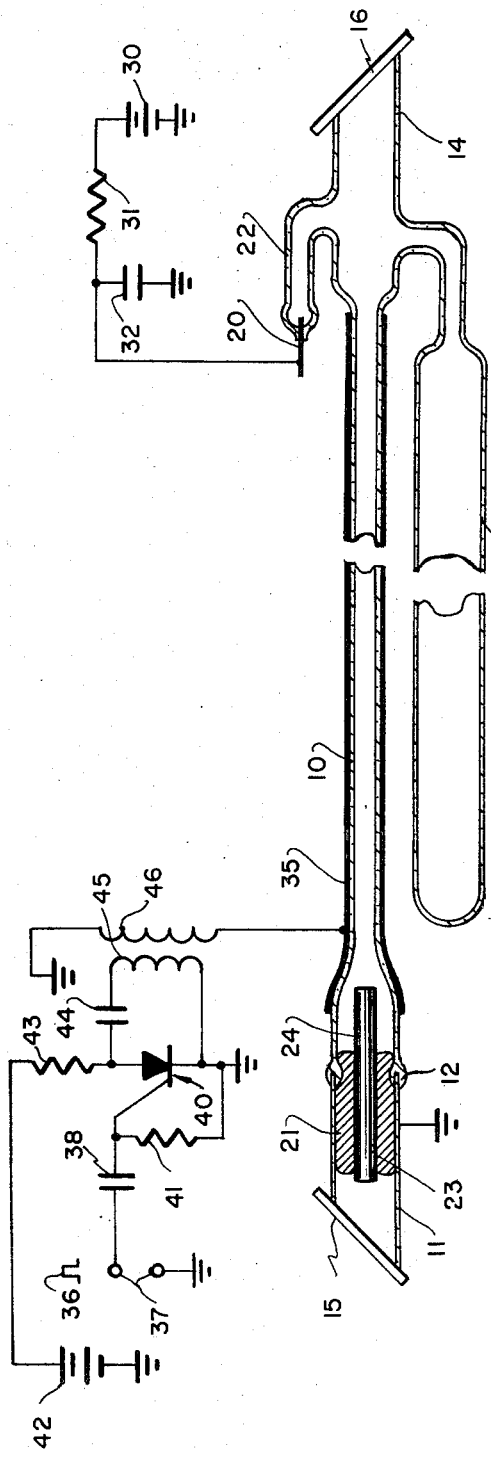
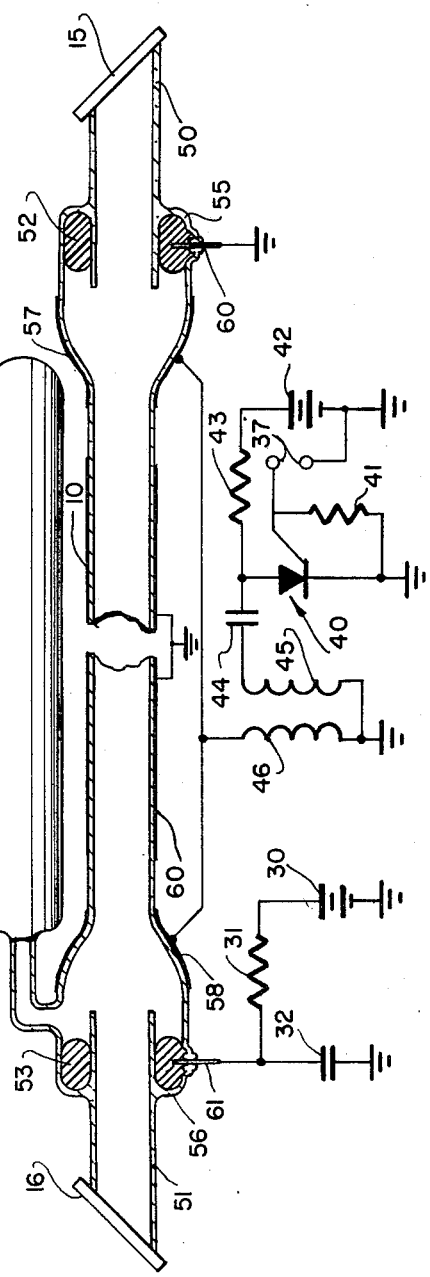
Robert S. Witte
C. Lee Dailey
Milford J. Eck
Walter H. Rutherford
INVENTORS
BY *Edw. C. Oen.*
ATTORNEY

COLD CATHODE CONSTRUCTION FOR GASEOUS LASER

BACKGROUND OF THE INVENTION

This invention relates generally to gaseous lasers, and particularly relates to the construction of the cold cathode of such a laser.

A gaseous laser having a cold cathode has been disclosed and claimed in the U.S. Pat. to Robert S. Witte and Charles E. Wood, No. 3,555,451 which issued on Jan. 12, 1971. In the past, such a cold cathode for a gaseous laser has usually been provided in an appendage to the main discharge tube and not in the path of the laser beam. Such a construction, however, is awkward and requires more space for the laser housing. Further, the appendage may become damaged in transit or by rough handling. The main purpose of this construction was to prevent sputtering of the cathode onto the windows of the laser. These windows are usually provided at the Brewster angle so that the laser beam issues as a linearly polarized light beam. In addition, of course, a window at the Brewster angle minimizes undesired light reflections. However, if cathode material due to sputtering deposits at the windows of the laser, the laser soon becomes inoperative due to the metallic deposit.

It is accordingly an object of the present invention to provide a gaseous laser of the cold cathode type having a coaxial cathode construction so arranged that sputtering of the windows is minimized.

Another object of the invention is to provide a gaseous laser such as a noble-gas ion laser where both cathode and anode consist of the same material, and where both electrodes are coaxial with the laser beam.

A further object of the present invention is to provide an argonion or xenon-ion laser having a cold cathode of the coaxial type substantially without the danger of cathode sputtering of the windows.

SUMMARY OF THE INVENTION

In accordance with the present invention there is provided a gaseous laser of the type having a cold cathode. By way of example, the laser may contain a noble gas which lases when ionized, and the cold cathode may, for example, consist of indium. The laser conventionally includes an elongated envelope of insulating material defining a main axis. A pair of windows of a material transparent to the laser radiation is sealed to the two ends of the envelope. The windows may be disposed at the Brewster angle and a laserable gas is provided in the envelope. The envelope has a major central portion of a predetermined diameter which defines the diameter of the laser beam. Both an anode and a cathode are disposed in the envelope. Thus the anode is arranged substantially at one end thereof and the cathode at the other end.

The cathode is selected from a member of the group consisting of bismuth, lead, tin, indium and gallium. Preferably, however, it consists of indium. Finally, a tube of insulating material, such for example as glass or ceramic, extends through the cathode. This tube is concentric with the main axis of the laser and extends in a direction toward the anode. The inner diameter of the tube is no less than that of the central portion of the envelope so that the laser beam may pass through the tube and through the cathode. This construction minimizes the sputtering of the cathode towards the windows.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

BRIEF DESCRIPTION OF THE DRAWING

FIG. 1 is a sectional view of a gas laser having a cold cathode in accordance with the present invention and an electronic circuit for triggering and operating the laser; and FIG. 2 is an elevational view, partly in section, of a modified laser embodying the present invention with an electronic circuit for triggering and operating the laser.

DESCRIPTION OF THE PREFERRED EMBODIMENTS

A preferred embodiment of the present invention is illustrated in FIG. 1 to which reference is now made. The gaseous laser of FIG. 1 includes an elongated envelope 10 which defines a main axis along which the laser beam issues. The envelope 10 may consist of any suitable insulating material such, for example, as glass or a ceramic. One end portion of the envelope 10 may be formed by a conductive tube 11 which may be sealed to the main envelope portion 10 by a seal 12. To this end the metal tube 11 may consist of any suitable metal or alloy which is capable of being readily sealed to glass or ceramic. An alloy consisting of iron, nickel and cobalt is well suited for this purpose and is sold under the trademark, "Kovar." The opposite end portion 14 may be part of the main envelope 10.

It should be noted that the two end portions 11 and 14 are preferably wider than the inner diameter of the main envelope portion 10. A pair of windows 15 and 16 are provided at the two end portions, 11 and 14. The two windows 15 and 16 are transparent to the radiation of the laser. Preferably they are disposed at the Brewster angle so that linearly polarized light issues from the two windows 15 and 16. Another advantage of windows disposed at the Brewster angle is that they minimize the loss of light by reflection. A gas reservoir 17 may be attached to and in communication with the laser envelope 10. The gas reservoir 17 has the purpose of supplying gas to the main discharge envelope 10 during operation of the laser. Thus, the ions by pumping action are moved from the anode to the cathode and the gas in the reservoir 17 may replenish the removed ions so as to maintain constant the gas pressure in the discharge region. Another purpose of the reservoir is to supply gas to the system to compensate for gas lost into the walls of the discharge tube 10 during operation.

The laser is provided with an anode 20 and a cathode 21. The anode 20 may, for example, consist of a tungsten pin extending into the interior of the envelope and may be mounted in a lateral branch 22 of the envelope away from the main axis of the tube. On the other hand the cathode 21 is disposed coaxial with the main tube axis and may be in conductive contact with the conductive tube end portion 11. The cathode 21 has a central bore or opening 23 through which extends an insulating tube 24. The tube 24 preferably has an inner diameter which is no less than the inner diameter of the main tube portion 10. In other words the tube 24 shall not limit the diameter of the laser beam. The tube 24 extends through the entire cathode 21 and protrudes beyond the cathode in a direction towards the anode. The purpose of this construction is to minimize the effects of cathode sputtering. Thus, particles of the cathode which may be removed by sputtering are prevented by the tube 24 from moving in a direction toward the window 15, and due to the length of the tube 10 they will be unable to reach the window 16. The tube 24 may also consist of a suitable insulating material such as glass or a ceramic.

The cathode 21 is preferably a cold cathode of the type described in the prior patent previously referred to. Thus, the cathode 21 may consist, for example, of bismuth, lead, tin, indium or gallium. Preferably it consists of indium. It should also be noted that the cathode 21 preferably protrudes beyond the metal sleeve 11 in a direction towards the anode so that the discharge takes place from the exposed face of the cathode 21 facing the anode 20.

The laser may be operated with any suitable gas. Preferably the laser is a noble-gas laser and may be filled, for example, with argon or xenon, or any other noble gas capable of lasing in its ionized state.

The operation of the laser is conventional. Thus, the cathode 21 may be grounded through its metal sleeve 11 as shown. The anode 20 may be supplied with a positive voltage from a battery 30 and a charging circuit including a resistor 31 connected serially between the battery 30 and the anode 20 and a bypass capacitor 32. The circuit 31, 32 operates to maintain the anode at a steady positive potential which may be on the order of a few thousand volts, while the cathode is grounded.

For the purpose of triggering the discharge or initiating the discharge, there may be provided a trigger electrode 35. The trigger electrode may consist of a wire or a metal sheet wrapped around the tube 10 or alternatively of any conducting paint. However, it is not necessary that the trigger electrode 35 extend over the entire surface of the tube 10. All that is necessary is that it cover at least the end portions of the tube 10. The trigger voltage is supplied to the trigger electrode 35 by the electronic circuit shown which is conventional. Thus, a positive trigger pulse 36 may be applied to the input terminals 37. The trigger impulse 36 is coupled by coupling capacitor 38 to a silicon-controlled rectifier 40 or any other conventional fast switch capable of carrying a high current. The cathode of the controlled rectifier 40 is grounded as shown while the trigger pulse is applied to its control electrode. A load resistor 41 is provided between the trigger electrode and ground as shown.

A positive voltage is applied from a battery 42 through a resistor 43 to the anode of the silicon-controlled rectifier 40. Furthermore, the voltage of the battery 42 is applied through a blocking capacitor 44 to the primary winding 45 of a transformer having a secondary winding 46. The secondary winding 46 is connected between ground and the trigger electrode 35.

During steady state operation the capacitor 44 is charged up to the voltage of battery 42. Since one terminal of the winding 46 is grounded the trigger electrode 35 is also at ground potential. However, when a trigger pulse 36 is impressed on the control electrode of the control rectifier 40, the rectifier becomes conductive and instantly discharges the charge on capacitor 44. This will now develop a high voltage pulse across the secondary winding 46 which is applied to the trigger electrode 35 which in turn initiates the discharge in the laser. Subsequent steady operation of the laser is maintained by the voltage of battery 30 applied to the anode 20.

The cathode 21 which may consist of indium may be constructed as follows. The cathode is first shaped in a jig to provide the bore 23 and placed in the metal sleeve 11. It is then centered by means of a rod inserted through the tube 10 and the cathode tube 23. Thereafter the indium cathode is melted in place by the application of heat so as to form an intimate conductive contact with the metal sleeve 11. The melting operation is preferably carried out with the laser tube in the vertical position and a teflon plug may be inserted below the indium cathode so as to seal the bottom of the tube while the cathode melts.

It has been found during operation of a laser of the type shown in FIG. 1 that it has a simplified construction which makes the laser more rugged and less liable to breakage during shipment or in operation. Also a slight increase in efficiency has been observed.

An additional increase in efficiency and ease of operation has been observed with the embodiment of FIG. 2 to which reference is now made. The laser of FIG. 2 again has a central tube or envelope portion 10 with two end portions 50 and 51. The two end portions 50 and 51 preferably again have an inner diameter which is no less than the inner diameter of the central envelope portion 10. The windows 15 and 16 are again sealed to the end portions 50 and 51 at the Brewster angle. The cathode 52 may again consist of indium and the anode 53 may also consist of indium or alternatively of the same material as does the cathode 52. The cathode 52 is disposed on the outside of envelope end portion 50 which is connected to the central envelope portion 10 by a suitable ring seal 55. The anode 53 may have the same construction and may also be disposed on the outside of envelope end portion 51 which may be sealed to the envelope central portion 10 by a ring seal 56.

The trigger electrode now consists of two separate portions 57 and 58 which may be disposed only at the two ends of the central envelope portion 10.

The tube of FIG. 2 otherwise operates in the same manner as does that in FIG. 1 and has the same electronic trigger circuit. Connections may be made to the cathode 52 and the anode 53, for example, by tungsten pins 60 and 61 which extend through the respective ring seals 55 and 56 into the metal electrodes. It has been found that the use of indium for both cathode and anode of the tube tends to make the tube easier to operate, that is, to break down the gas into ions to carry the discharge.

The coaxial construction of the laser FIG. 2 yields an additional advantage. It permits the inductance of the tube and of the discharge to be minimized. This is particularly important where it is desired to operate the laser to generate pulses of very short time duration. In order to minimize the inductance it is feasible to provide a shield 60 operating as a coaxial return to the laser of FIG. 2. This shield may be in the form of a metallic sleeve which may, for example, consist of a thin copper sheet. The shield 60 which surrounds the tube 10 should be snug to the tube, but should be spaced from and insulated electrically from the trigger electrodes 57 and 58. Preferably the shield is grounded as shown.

Such a conductive shield will reduce the inductance of the discharge tube. In this connection the coaxial geometry of the current flow is particularly advantageous. Furthermore, the symmetry of this configuration makes it unlikely that magnetic fields are generated or induced by a non-symmetrical current. In contradistinction if a single wire ground return would be used, a large magnetic field is generated due to high electric currents of an ion laser. Such a large magnetic field would exist about a ground wire and may eventually push the plasma to one side of the tube. This, of course, spoils efficient laser operation. Such a magnetic field effect is particularly large in ion lasers having a large bore on the order of more than 1 centimeter.

There has thus been disclosed a gaseous laser of the cold cathode type. The cold cathode has a simplified and more rugged construction and substantially eliminates sputtering of the windows. If both cathode and anode consist of the same material for the cold cathode, such for example as indium, it has been found that breakdown of the gas into ions is facilitated.

What is claimed is:

1. A gaseous laser of the type having a cold cathode comprising:
   a. an elongated envelope of insulating material defining a main axis;
   b. a pair of windows of a material transparent to the laser radiation sealed to the two ends of said envelope;
   c. a laserable gas disposed in said envelope, said envelope having a major central portion of a predetermined diameter defining the diameter of the laser beam;
   d. an anode disposed in said envelope, substantially at one end thereof;
   e. a solid cathode selected from a member of the group consisting of bismuth, lead, tin, indium and gallium, said cathode having a portion directly facing said anode and being disposed in said envelope substantially at the other end thereof; and
   f. a hollow tube of insulating material extending through said cathode and concentric with said main axis, said solid cathode contacting both said envelope and said hollow tube, said tube extending in a direction toward said anode, said tube having an inner diameter no less than the inner diameter of said central portion of said envelope, the gaseous discharge extending directly from said portion of said cathode to said anode substantially only through the envelope portion between said anode and said cathode portion, whereby sputtering of said cathode toward said windows is minimized.

2. A laser as defined in claim 1 wherein said anode consists of the same material as said cathode.

3. A laser as defined in claim 1 wherein a gas reservoir is connected to and in communication with said envelope for supplying gas during operation of said laser.

4. A noble-gas ion laser of the cold cathode type comprising:
   a. an elongated envelope of insulating material defining a major axis, said envelope being filled with a noble, laserable gas;
   b. a window transparent to the radiation of said laser closing each of the end portions of said envelope, each of said windows being disposed at the Brewster angle with respect to said major axis;
   c. an anode and a solid cathode each being disposed in one of the end portions of said envelope and each consisting of indium;
   d. each of said end portions of said envelope consisting of an insulating tube having an inner diameter no less than the diameter of the laser beam, each of said end portions surrounding said envelope to provide an annular space therebetween, said annular spaces facing each other and being in direct communication with each other through the envelope portion between said anode and said cathode; and
   e. said solid indium cathode and said indium anode being disposed each in the annular space of one of said end portions and each contacting both its associated insulating tube and said envelope, whereby sputtering of said cathode toward said windows is minimized.

5. A laser as defined in claim 4 wherein a gas reservoir is connected to and in communication with said envelope for supplying gas thereto during operation.

* * * * *